US008566949B2

(12) United States Patent
Ikeda et al.

(10) Patent No.: US 8,566,949 B2
(45) Date of Patent: Oct. 22, 2013

(54) SOFTWARE COMPONENT, SOFTWARE COMPONENT MANAGEMENT METHOD, AND SOFTWARE COMPONENT MANAGEMENT SYSTEM

(75) Inventors: Nobuyuki Ikeda, Fuchu (JP); Hirotaka Toya, Yokohama (JP); Ikuko Osajima, Yokohama (JP); Katsumasa Jin, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1525 days.

(21) Appl. No.: 11/866,689

(22) Filed: Oct. 3, 2007

(65) Prior Publication Data

US 2008/0141380 A1    Jun. 12, 2008

(30) Foreign Application Priority Data

Dec. 12, 2006  (JP) .................................. 2006-334810

(51) Int. Cl.
*H04L 29/06*  (2006.01)

(52) U.S. Cl.
USPC .............................. 726/26; 726/22; 713/193

(58) Field of Classification Search
USPC ..................................................... 726/22, 26
See application file for complete search history.

(56) References Cited

U.S. PATENT DOCUMENTS

| | | | |
|---|---|---|---|
| 6,044,469 A * | 3/2000 | Horstmann | 726/29 |
| 6,375,616 B1 | 4/2002 | Soferman et al. | |
| 6,575,907 B1 | 6/2003 | Soferman et al. | |
| 7,565,322 B1 * | 7/2009 | Feldman et al. | 705/50 |
| 2002/0029347 A1 * | 3/2002 | Edelman | 713/193 |
| 2002/0107809 A1 * | 8/2002 | Biddle et al. | 705/59 |
| 2003/0161473 A1 * | 8/2003 | Fransdonk | 380/277 |
| 2006/0059099 A1 * | 3/2006 | Ronning et al. | 705/59 |

FOREIGN PATENT DOCUMENTS

| | | |
|---|---|---|
| CN | 1364249 A | 8/2002 |
| JP | 2000-105696 | 4/2000 |
| JP | 2004-213057 | 7/2004 |
| WO | WO 01/69350 A1 | 9/2001 |

* cited by examiner

*Primary Examiner* — Mohammad L Rahman

(74) *Attorney, Agent, or Firm* — Oblon, Spivak, McClelland, Maier & Neustadt, L.L.P.

(57) ABSTRACT

A non-transitory, computer-readable medium stores a software component that includes a fraud examination module. The fraud examination module restricts a use of the software component if the use is unauthorized. The fraud examination module includes fraud determination data which predefines use conditions. The fraud examination modules also includes a determination module that obtains use data and determines the use of the software component to be unauthorized if the obtained use data does not match the use conditions. The use conditions predefined by the fraud determination data include a device identification number which is unique to a device on which an installation of the software component is permitted. The determination module obtains, through an operating system, a device identification number which is unique to a device on which the software component is actually installed as the use data.

10 Claims, 8 Drawing Sheets

SOFTWARE COMPONENT, SOFTWARE COMPONENT MANAGEMENT METHOD, AND SOFTWARE COMPONENT MANAGEMENT SYSTEM

CROSS REFERENCE TO RELATED APPLICATION

This application is based upon and claims the benefit of priority of the prior Japanese Patent Application No. 2006-334810, filed Dec. 12, 2006, the entire contents of which are incorporated herein by reference.

BACKGROUND OF THE INVENTION

1. Field of the Invention

The present invention relates to software components, software component management methods, and software component management systems, and particularly relates to a software component used as a "component" by various application software programs, a software component management method for managing the software component, and a software component management system for managing the software component.

2. Description of the Related Art

In today's form of software development, program segments obtained by dividing an existing software program into appropriate units are often treated as components (hereinafter referred to as software components). By combining a plurality of developed software components, a new software program can be created efficiently.

At the same time, as the size of software programs increases, the form of software development is shifting from a vertical integration type to horizontal division of work, in which a single software program is often developed by a plurality of companies. Additionally, it has become common to reuse software components to improve development efficiency. Under such circumstances, a software component developed by one company is often provided for use by other companies. To prevent unauthorized use of such a software component by a "user", it is typically required for an "administrator" of the software component to put certain restrictions on the use of the software component.

"Administrator" of a software component is an operator who performs management tasks for the software component. Examples of such management tasks include delivery, use tracking, version control, collection and reporting of information about defects and extension, and support for the application of the software component.

"User" of a software component is an operator who uses the software component to develop an application software program. Here, an end user who indirectly uses the software component by using the developed application software program is not referred to as "user" of the software component.

Unauthorized use of a software component is, for example, use of the software component in systems for unintended clients, leakage of the software component to unintended third parties, or use of the software component beyond the contract period, such as a predetermined operation period or trial period for evaluation purposes.

Generally, "user" contracts with "administrator" for use of the software component. The contract normally prohibits unauthorized use of the software component.

However, unauthorized use of the software component may occur due to carelessness of "user". For example, "user" may inadvertently forget about the contract period and continue to use the software component. It will be impossible to completely eliminate such human errors. Additionally, if a malicious user intentionally makes unauthorized use of the software component, it will be difficult to immediately stop such unauthorized use.

Exemplary techniques for preventing unauthorized use of software are disclosed in JP-A 2004-213057 or JP-A 2000-105696.

JP-A 2004-213057 discloses a technique in which, through a network, a license approval server periodically issues a software license to a user terminal connected to the network or periodically updates the software license, thereby preventing unauthorized use of the software. The software license is issued or updated by periodically issuing or updating an authentication file, which gives permission to use the software.

JP-A 2000-105696 discloses a technique in which public key data and device identification data encrypted with a private key corresponding to the public key are used to control the prohibition or permission of execution of software. When providing software, a provider of the software also provides, in the form of an appropriate recording medium, a user with a public key and device identification data encrypted with a private key. The device identification data identifies a device on which use of the software is permitted. To execute the software, the user uses the received public key to decrypt the received device identification data. Then, the decrypted device identification data is compared with identification data that is unique to the device on which the software is to be run. If they do not match, execution of the software is prohibited.

In the technique disclosed in JP-A 2004-213057, a software license is issued or updated through a network. Therefore, if a device on which the software is to be used is not connected to the network, it is not possible to prevent unauthorized use of the software on the device. Additionally, in this technique, the software license is provided in the form of an authentication file separately from the software to be used. This is inefficient because an additional means for associating the authentication file with the software is required. Moreover, since the software and the authentication file are separately provided, it is possible that a mismatched combination of software and authentication file may be provided by mistake. Also, separately providing them is inconvenient in handling.

In the technique disclosed in JP-A 2000-105696, software to be used and a recording medium in which encrypted device identification data and a public key are recorded are also provided separately. This involves human intervention to associate them with each other and thus may cause errors in the associating process.

Additionally, in the techniques disclosed in JP-A 2004-213057 and JP-A 2000-105696, unauthorized use is prohibited on an application software basis. This means that it is not possible to eliminate unauthorized use on a lower-level component basis. That is, it is not possible to eliminate unauthorized use of software components included in the application software.

SUMMARY OF THE INVENTION

The present invention has been made in view of the circumstances described above. An object of the present invention is to provide a software component (which is provided by an administrator) capable of independently preventing its unauthorized use, a software component management method for managing the software component, and a software component management system for managing the software component.

To solve the problems described above, according to an aspect of the present invention, a software component capable of performing predetermined functions includes a fraud examination module configured to examine, when the software component is executed, whether use of the software component is unauthorized, and to restrict the use of the software component if the use is unauthorized.

To solve the problems described above, according to another aspect of the present invention, in a software component management method for managing a software component capable of performing predetermined functions, the software component performs the steps of examining, when the software component is executed, whether use of the software component is unauthorized, and restricting the use of the software component if the use is unauthorized.

To solve the problems described above, according to another aspect of the present invention, a software component management system includes a software component capable of performing predetermined functions, a user terminal on which the software component is installed, and a component management server connected to the user terminal through a telecommunication line. The software component includes a fraud examination module configured to examine, when the software component is executed, whether use of the software component is unauthorized, and to restrict the use of the software component if the use is unauthorized.

DESCRIPTION OF THE PREFERRED EMBODIMENTS

Embodiments of the software component, software component management method, and software component management system of the present invention will now be described with reference to the attached drawings.

Figure 1:
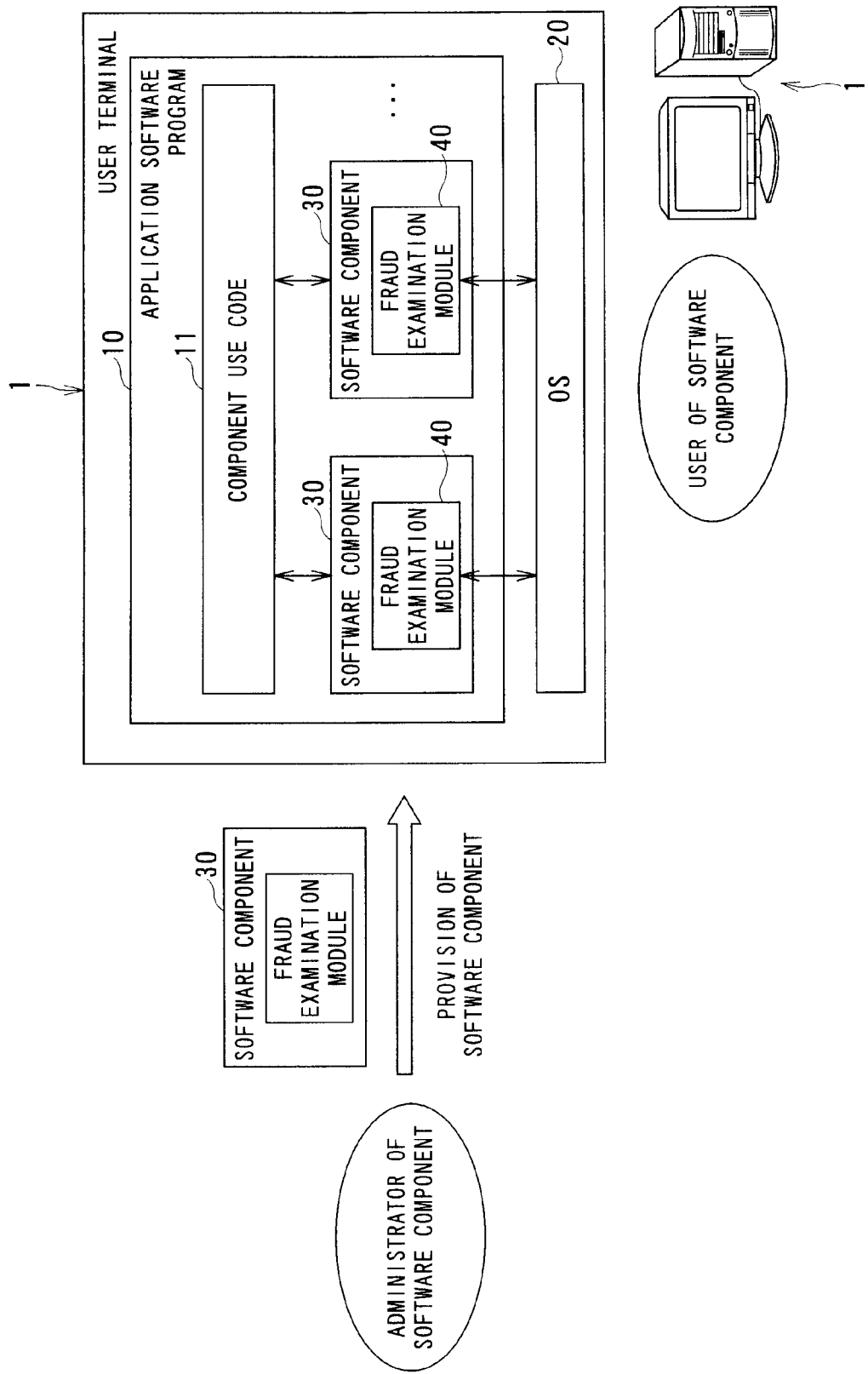
FIG. 1 illustrates an exemplary configuration of a user terminal on which a software component according to an embodiment of the present invention is installed.

FIG. 1 illustrates an exemplary form of use of a software component 30 according to an embodiment of the present embodiment.

The software component 30 is managed by an administrator. A user uses the software component 30 provided by the administrator.

Generally, the user contracts with the administrator for use of the software component 30. For example, the contract specifies a device (or user terminal) on which the software component 30 is to be installed and used and defines a period of use of the software component 30. An object of the present embodiment is to ensure that the contract is implemented and to prevent breach of the contract (i.e., prevent unauthorized use of the software component 30).

The software component 30 may be used in various forms. The following description refers to an example in which the software component 30 is included in an application software program 10 installed on a user terminal 1 and used. The user terminal 1 is a device, such as a personal computer, on which the software component 30 is used.

In addition to the application software program 10, an operating system (OS) 20 is also installed on the user terminal 1.

The software component 30 is a program segment obtained by dividing a program into predetermined functional units, and generally refers to a functional unit of a general-purpose program. As in the case of components of an apparatus, combining a plurality of software components 30 or adding other software programs to the combination of the software components 30 can create a larger software program (application software program 10) having specific functions.

The software components 30 may be of any type, size, or number as long as they are general-purpose programs and can be used as components. For example, a general-purpose program, such as a Fourier analysis program or an access program for accessing a database having a predetermined data structure, can serve as a software component 30.

The application software program 10 includes component use code 11 described as a program for calling a software component 30. The software component 30 is appropriately called through the component use code 11 by the application software program 10 and executed.

Each software component 30 includes a fraud examination module 40. If the fraud examination module 40 detects unauthorized use of the software component 30, a use restriction process, such as stopping of execution of the software component 30 or application software program 10, is performed.

The administrator installs the fraud examination module 40 in the software component 30, which is then delivered to the user.

To prevent the user from tampering with the fraud examination module 40, it is preferable that the software component 30 be provided as a black box component. For example, such a black box component can be realized by delivering the software component 30 to the user in binary form.

(1) Configuration and Operation of Software Component

Figure 2:
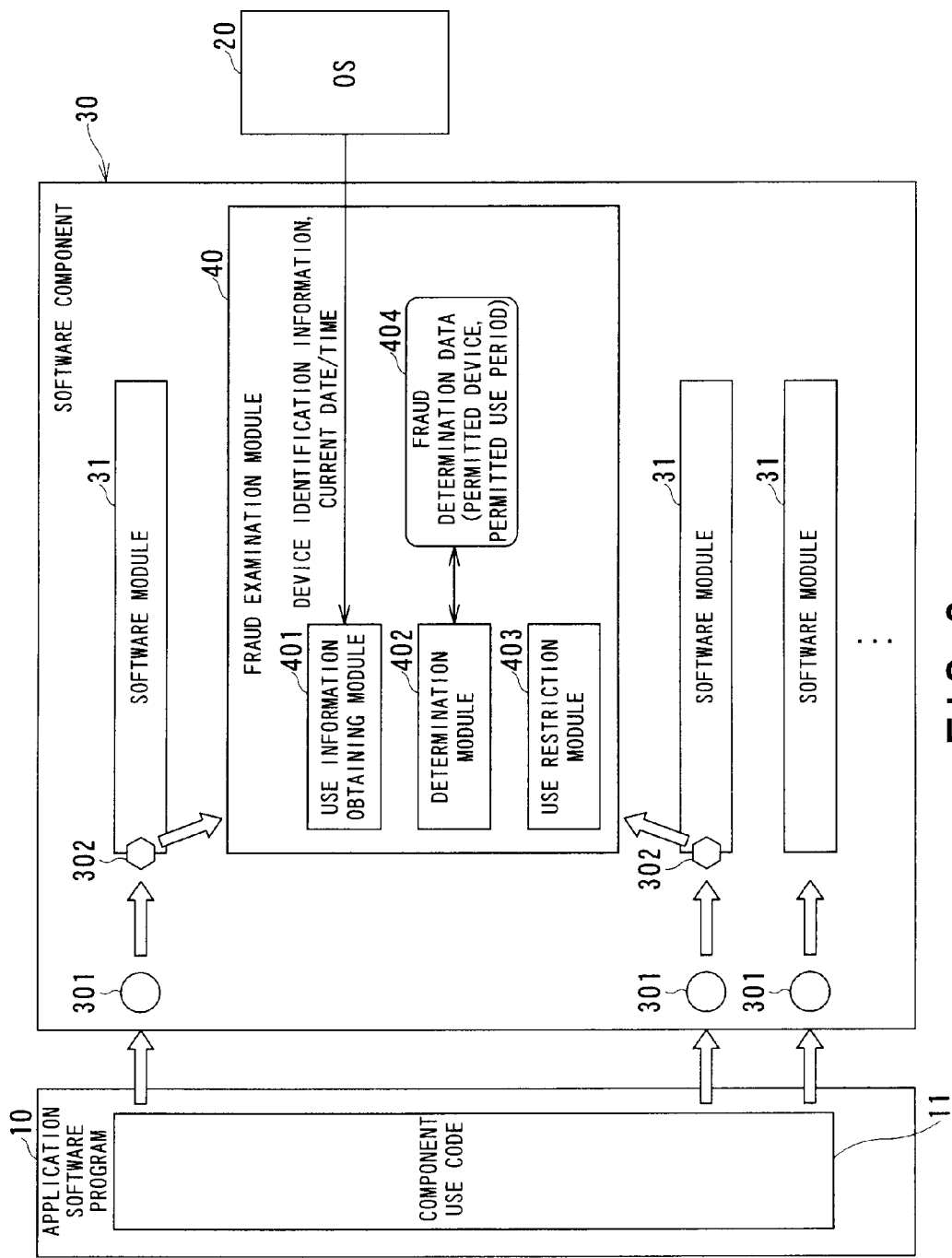
FIG. 2 illustrates an exemplary configuration of the software component of the embodiment.

FIG. 2 illustrates an exemplary configuration of the software component 30. The software component 30 includes at least one set of a module call interface 301, a software module 31, and a hook point 302. The module call interface 301 receives a call from outside (component use code 11). The software module 31 is started when the module call interface 301 is called. The hook point 302 causes the fraud examination module 40 to start when the software module 31 is started.

The software module 31 is a module in which functions originally intended to be realized by the software component 30 are described. The software module 31 may also be referred to as a subroutine or a function. In an object-oriented language, such as Java or C++, the software module 31 is often referred to as a method.

The software component 30 is typically composed of multiple software modules 31, but may be composed of a single software module 31.

When the software component 30 includes multiple software modules 31, one of these software modules 31 may be selected and provided with the module call interface 301 and the hook point 302. In this case, it is preferable that the software module 31 which is always called during execution of the software component 30 be selected. Examples of such a module which is always called include a module for initialization of the software component 30 and a module for post-processing at the termination of the software component 30. In a language, such as Java, C++, or C#, a module (method) referred to as a constructor or a destructor corresponds to such a module.

The module call interface 301 is an interface which receives a call from the component use code 11 outside the software component 30. The module call interface 301 is realized by a method definition of "interface" in each language, such as Java, C++, or C#.

The hook point 302 is a mechanism of a hooking means that temporarily suspends execution of the software module 31 when the software module 31 is started, and starts the fraud examination module 40. Generally, hooking refers to intercepting an input or a message to perform unique processing. In the present embodiment, the fraud examination module 40 temporarily intercepts processing initiative of the software module 31. Then, upon completion of processing of the fraud examination module 40, execution of the software module 31 is resumed.

The fraud examination module 40 includes a use information obtaining module 401, a determination module 402, a use restriction module 403, and fraud determination data 404.

The operation (software component management method) of the software component 30 configured as described above will be described with reference to FIG. 3 and FIG. 4.

Figure 3:
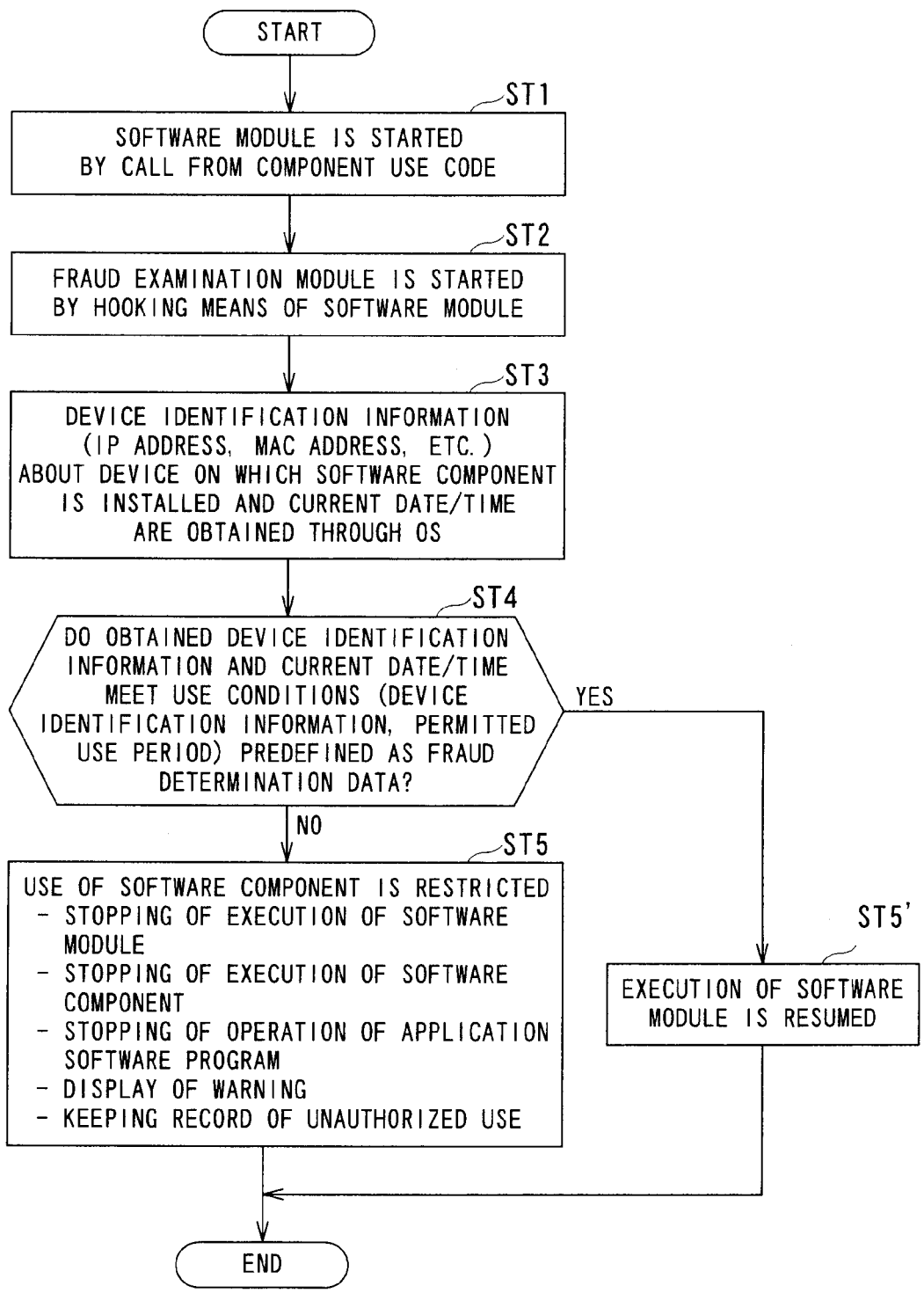
FIG. 3 is a flowchart showing an exemplary operation of the software component of the embodiment.
Figure 4:
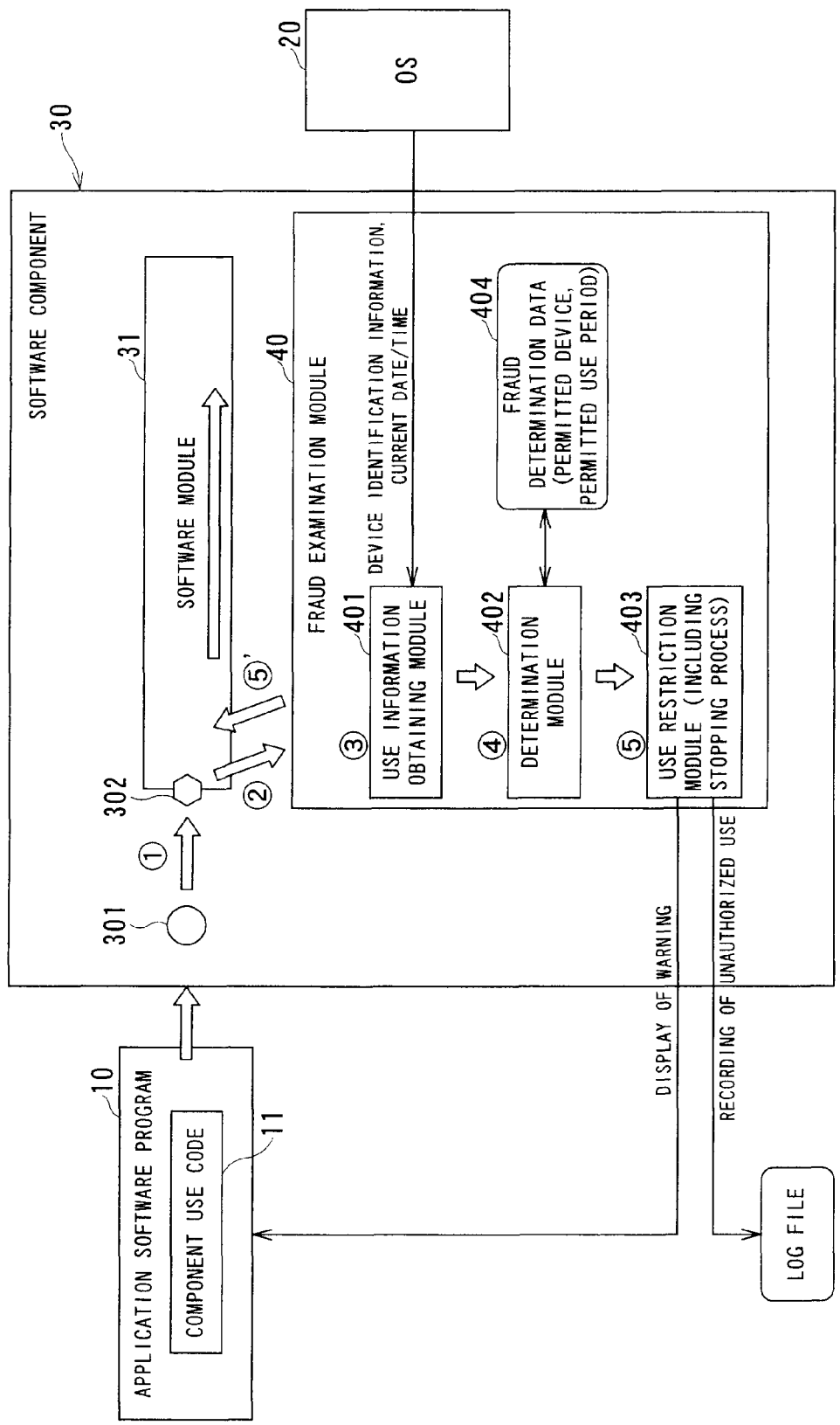
FIG. 4 is a configuration diagram in which a processing flow of the software component of the embodiment is shown.

FIG. 3 is a flowchart showing a processing flow of the software component 30. FIG. 4 is a configuration diagram in which a processing flow of the software component 30 is indicated by arrows. Circled numbers in FIG. 4 correspond to respective step numbers in the flowchart of FIG. 3.

When the software component 30 is executed, the software module 31 in the software component 30 is started in response to a call from the component use code 11 of the application software program 10. The software module 31 is started through the module call interface 301 (step ST1 of FIG. 3).

Next, processing is transferred to the fraud examination module 40 by the hooking means (hook point 302) of the software module 31. In other words, execution of the software module 31 is interrupted and the fraud examination module 40 is started (step ST2).

When the fraud examination module 40 is started, the use information obtaining module 401 first obtains use information about use of the software component 30 (step ST3). The use information obtained here corresponds to use conditions defined as the fraud determination data 404.

As described above, examples of the fraud determination data 404 include device identification information about a device (user terminal) on which use of the software component 30 is permitted, and a time period during which use of the software component 30 is permitted. Such information is described or set as the fraud determination data 404 in the fraud examination module 40. The fraud determination data 404 is described or set by the administrator.

As data corresponding to the fraud determination data 404, the use information obtaining module 401 obtains, from the OS 20, current time information and device identification information about a device (user terminal 1) on which the software component 30 is actually installed. Examples of the device identification information include an IP address and MAC address of the user terminal 1.

Next, the determination module 402 determines whether the obtained device identification information and current time information meet the use conditions defined as the fraud determination data 404 (step ST4).

If the obtained device identification information matches identification information about a permitted device and the obtained current time information is within a permitted period of use, the determination module 402 determines that unauthorized use of the software component 30 does not occur. Then, execution of the software module 31 is resumed (step ST5').

On the other hand, if the obtained device identification information does not match identification information about a permitted device or the obtained current time information is not within the permitted period of use, the determination module 402 determines that unauthorized use of the software component 30 occurs. Then, the processing proceeds to step ST5.

To restrict (deter or eliminate) unauthorized use of the software component 30, the use restriction module 403 takes at least one of the following measures: a) display of warning; b) keeping a record (log) of unauthorized use; c) stopping of execution of the software module 31; and d) stopping of operation of the application software program 10 (step ST5).

Here, "display of warning" means, for example, displaying a warning message against unauthorized use by using a display function of the application software program 10. The display of warning can prevent unauthorized use of the software component 30 caused by simple carelessness or the like.

"Keeping a record (log) of unauthorized use" means recording the fact of unauthorized use, its details, time of occurrence, and the like as a log file in an appropriate storage medium. Automatically keeping a record of unauthorized use has a deterrent effect against unauthorized use. Using both "display of warning" and "keeping a record of unauthorized use" can enhance the deterrent effect on malicious users.

"Stopping of execution of the software module 31" means skipping the execution of the software module 31 instead of resuming it, and returning the processing to the side from which the software module 31 has been called. This can prevent the user from using the original function of the software component 30 while allowing the application software program 10 to continue operating. That is, "stopping of execution of the software module 31" can prevent the use of the function of the software component 30, thereby preventing unauthorized use of the software component 30.

"Stopping of operation of the application software program 10" means further stopping the operation of the application software program 10 which uses the software component 30. For example, the operation of the application software program 10 can be stopped by a method, such as stopping a system call of the OS 20 or a process or thread using a function of a library provided by a programming language, or an infinite loop.

As described above, the software component 30 of the present embodiment includes information (fraud determination data 404) for determining unauthorized use of the software component 30, fraud detecting means (use information obtaining module 401 and determination module 402) for detecting fraud, and execution means (use restriction module 403) which executes appropriate processing when fraud is detected. Therefore, while it is difficult for a human to properly control unauthorized use of the software component 30, the software component 30 configured as described above can control such unauthorized use and protect interests of the administrator who provides the software component 30.

In the present embodiment, data (fraud determination data 404) for determining the unauthorized use of the software component 30 is embedded in the software component 30 itself. Therefore, compared to the case where the software component 30 and fraud determination data are provided in separate files, it becomes more difficult to tamper with the fraud determination data.

When the software component 30 and fraud determination data are provided in separate files, an associating means for associating them with each other is required. However, in the present embodiment, since the software component 30 is provided to the user with the fraud determination data 404 embedded therein, such an associating means is not required. Additionally, no human error occurs since human intervention required for such an associating operation is no longer needed.

Moreover, in the present embodiment, since the fraud examination module 40 is always started simultaneously when the software component 30 starts executing its original function, it is possible to achieve more reliable detection of fraud than in the case where fraud detection is performed only when the software component 30 is installed.

Additionally, since the fraud examination module 40 is connected to the software module 31 of the software component 30 through the hook point 302, the operation of the fraud examination module 40 does not affect the original operation of the software module 31. Therefore, if the fraud examination module 40 becomes no longer needed, it is possible to easily remove the fraud examination module 40 without affecting the software module 31.

(2) Software Component Management System

As described above, the software component 30 is provided to the user with the fraud determination data 404 for detection of unauthorized use embedded therein. The fraud determination data 404 is based on a use contract between the administrator and the user, but the use contract may be changed.

Therefore, a software component management system 100 (described below) of an embodiment of the present invention is configured such that when the use contract is changed, the fraud determination data 404 in a software component can be updated from outside the user terminal 1 through a telecommunication line.

Figure 5:
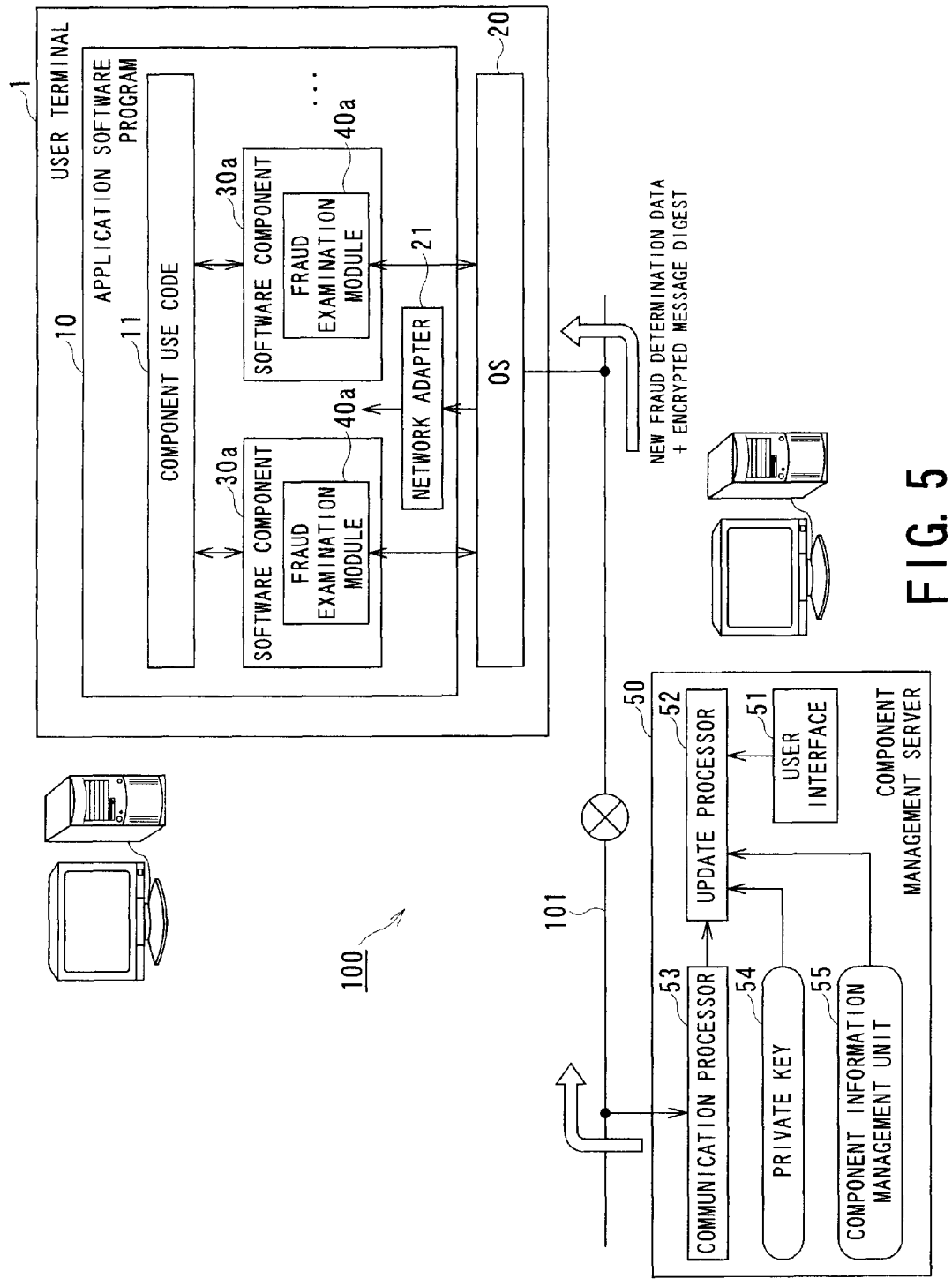
FIG. 5 illustrates an exemplary configuration of a software component management system according to an embodiment of the present invention.

FIG. 5 illustrates an exemplary configuration of the software component management system 100 according to the present embodiment.

The software component management system 100 includes the user terminal 1 and a component management server 50, which are connected to each other through a telecommunication line 101.

The component management server 50 is a server installed on the administrator's side, while the user terminal 1 is a terminal device installed on the user's side.

The component management server 50 includes a user interface 51, an update processor 52, a communication processor 53, a private key 54, and a component information management unit 55.

The user interface 51 inputs instructions from the administrator while displaying various information. For example, the user interface 51 includes a keyboard, a pointing device, a display device (none of which is shown), and the like.

The update processor 52 creates, on the basis of instructions input from the user interface 51, new fraud determination data for updating the fraud determination data 404 in the software component 30. Additionally, the update processor 52 creates a hash value (which may also be referred to as a message digest) from the created new fraud determination data and encrypts the hash value.

The component information management unit 55 is a database in which management information for the software component 30 is stored. The component information management unit 55 is used to create new fraud determination data.

The private key 54 is an encryption key stored on the administrator's side. The update processor 52 uses the private key 54 to encrypt the hash value of the new fraud determination data.

The communication processor 53 transmits the new fraud determination data and the encrypted hash value through the telecommunication line 101 to the user terminal 1.

The software component management system 100 allows external updating of the fraud determination data 404. To achieve this, an updating function is added to the fraud examination module 40 of the software component 30. Hereinafter, the software component 30 and the fraud examination module 40 with such an updating function are referred to as a software component 30a and a fraud examination module 40a, respectively.

Figure 6:
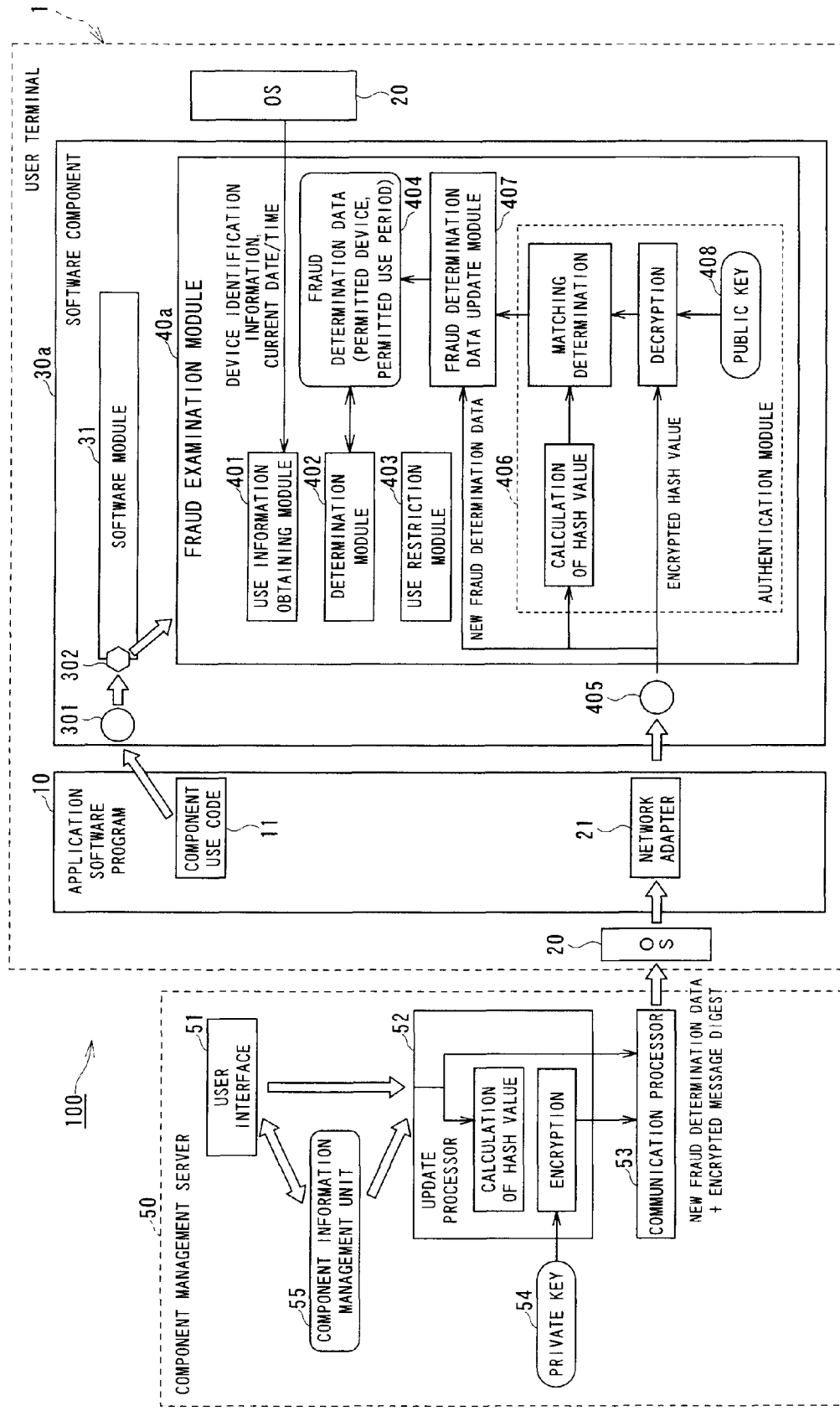
FIG. 6 illustrates an exemplary configuration of the software component management system of the embodiment, and particularly illustrates an exemplary configuration of a software component used therein in detail.

FIG. 6 illustrates an exemplary configuration of the software component management system 100 according to the present embodiment. FIG. 6 particularly illustrates an internal configuration of the software component 30a of FIG. 5 in detail.

The software component 30a is obtained by adding a data update interface 405 to the software component 30 and replacing the fraud examination module 40 with the fraud examination module 40a. The fraud examination module 40a is obtained by adding an authentication module 406 and a fraud determination data update module 407 to the fraud examination module 40.

The data update interface 405 receives a call from outside the software component 30a, such as from a network adapter 21 in the application software program 10. The data update interface 405 passes data transmitted from the component management server 50 to the authentication module 406 and to the fraud determination data update module 407 in the fraud examination module 40a.

The authentication module 406 is a functional module which uses a public key 408 to authenticate data transmitted from the component management server 50. The public key 408 is paired with the private key 54 in the component management server 50.

The fraud determination data update module 407 is a functional module which updates, if authentication is successful, the fraud determination data 404 with new fraud determination data.

The operation of the software component management system 100 configured as described above, in particular, a method for updating the fraud determination data 404 will now be described with reference to FIG. 7 and FIG. 8.

Figure 7:
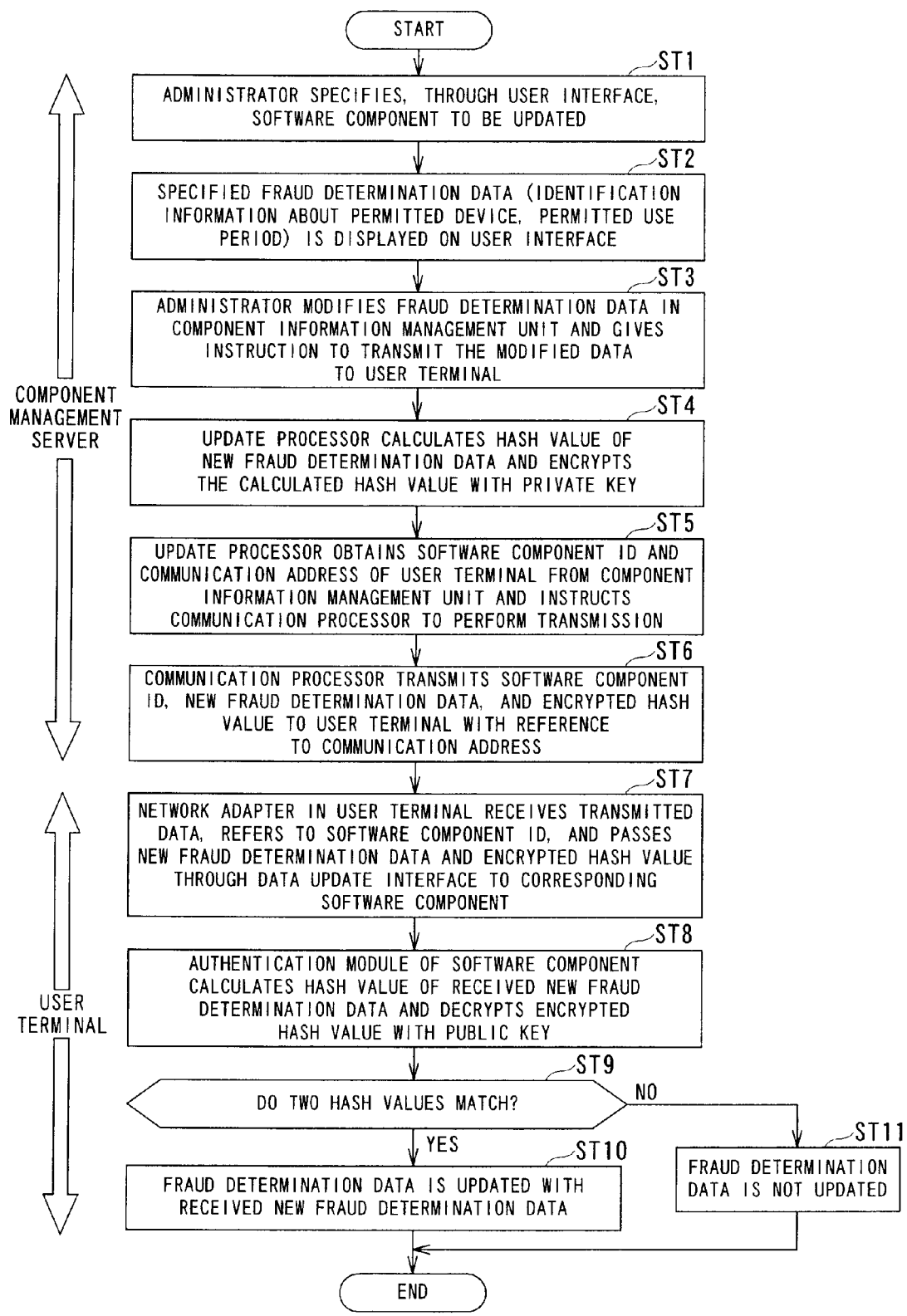
FIG. 7 is a flowchart showing an exemplary operation of the software component management system of the embodiment.
Figure 8:
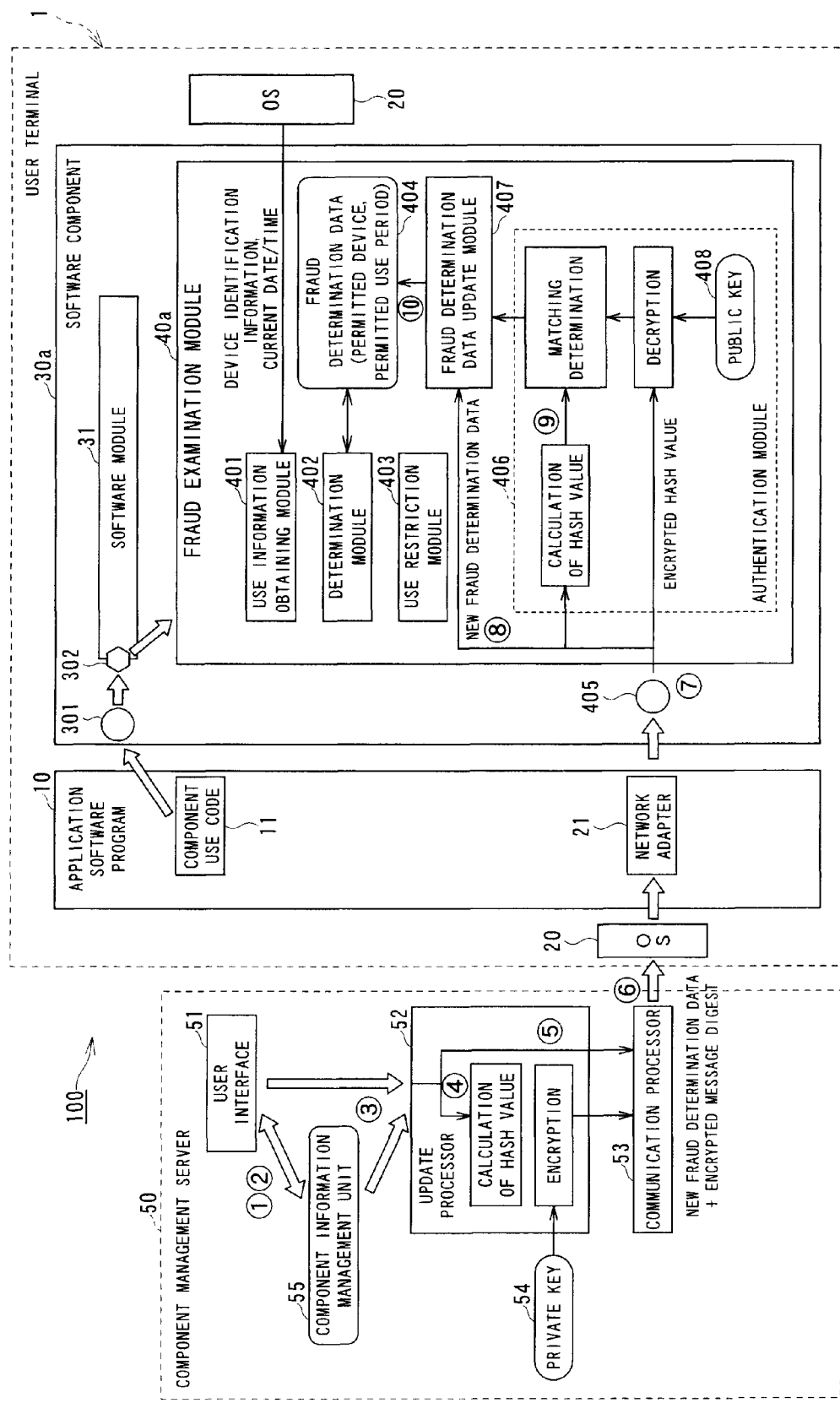
FIG. 8 is a configuration diagram in which a processing flow of the software component management system of the embodiment is shown.

FIG. 7 is a flowchart showing an exemplary method for updating the fraud determination data 404. FIG. 8 is a configuration diagram in which a processing flow of the software component management system 100 is shown. Circled numbers in FIG. 8 correspond to respective step numbers in the flowchart of FIG. 7.

First, through the user interface 51, the administrator specifies the software component 30a to be updated (step ST1 of FIG. 7).

Next, the fraud determination data 404 (before update) for the software component 30a is displayed on the user interface 51 (step ST2). The displayed fraud determination data 404 includes device identification information about a device on which use of the software component 30a is permitted, a time period during which use of the software component 30a is permitted, and the like.

Then, after appropriately modifying the fraud determination data 404 to create new fraud determination data, the administrator gives an instruction to transmit the created new fraud determination data to the user terminal 1 (step ST3).

The update processor 52 calculates a hash value of the new fraud determination data and encrypts the hash value with the private key 54 (step ST4).

Additionally, the update processor 52 obtains, from the component information management unit 55, identification information (ID) for identifying the software component 30a and a communication address of the user terminal 1 on which the software component 30a is installed. Then, the update processor 52 instructs the communication processor 53 to perform transmission (step ST5).

Then, the communication processor 53 transmits the new fraud determination data, ID of the software component 30a, and encrypted hash value to the user terminal 1 with reference to the communication address (step ST6). The processing of steps ST1 to ST6 described above is performed by the component management server 50.

The data from the communication processor 53 is transmitted through the OS 20 of the user terminal 1 to the application software program 10. The network adapter 21 in the application software program 10 refers to the ID of the software component 30a to identify the corresponding software component 30a and passes, through the data update interface 405, the new fraud determination data and encrypted hash value to the fraud examination module 40a of the software component 30a (step ST7).

The authentication module 406 in the fraud examination module 40a decrypts the encrypted hash value with the public key 408 while calculating a hash value from the received new fraud determination data (step ST8).

Then, the authentication module 406 determines whether these two hash values match (step ST9). If the two hash values match, the authentication is successful. If the two hash values do not match, the authentication fails.

If the authentication is successful, the fraud determination data update module 407 updates the fraud determination data 404 with the new fraud determination data transmitted from the component management server 50 (step ST10).

On the other hand, if the authentication fails, the fraud determination data 404 is not updated (step ST11).

In the software component management system 100 of the present embodiment, when the fraud determination data 404 needs to be updated in response to contract change or the like, the fraud determination data 404 can be easily updated through the telecommunication line 101.

Additionally, since new fraud determination data is transmitted along with its hash value, which is encrypted by public key encryption, it is possible to prevent the new fraud determination data from being tampered with.

In the software component management system 100 of the present embodiment, the software component 30a also can independently detect its unauthorized use. If unauthorized use is detected, a use restriction process, such as stopping of execution of the software component 30a or stopping of operation of the application software program 10, is performed. Therefore, the software component management system 100 may be configured such that the user terminal 1 usually operates on a standalone basis and is connected through the telecommunication line 101 to the component management server 50 only when the fraud determination data 404 is to be updated.

As described above, the software component 30 and the software component management method make it possible that a software component provided by the administrator can independently prevent its unauthorized use.

Additionally, the software component management system 100 makes it possible to update, through the telecommunication line 101, the fraud determination data 404 recorded in the software component 30a. Therefore, even when there is any change in use contract, the change can be reflected easily and immediately.

The present invention is not limited to the embodiments described above but may be embodied, in the implementation phase, by modifying the components within the scope of the present invention. Additionally, the present invention can be realized in various ways by appropriately combining the plurality of components disclosed in the embodiments described above. For example, some components disclosed in one embodiment may be removed, or some components in different embodiments may be appropriately combined.

What is claimed is:

1. A non-transitory, computer-readable medium storing a software component, which, when executed by a processing unit, is capable of performing predetermined functions, the software component comprising:

a fraud examination module configured to examine, when the software component is executed, whether a use of the software component is unauthorized, and to restrict the use of the software component if the use is unauthorized, wherein the fraud examination module includes fraud determination data which predefines use conditions about the use of the software component, the use conditions including a first device identification number which is unique to a device on which an installation of the software component is permitted;

a use information obtaining module configured to obtain use data about an actual use of the software component, the use data including a second device identification number which is unique to a device on which the software component is actually installed;

a determination module configured to determine whether the obtained use data matches the use conditions predefined by the fraud determination data, and to determine the use of the software component to be unauthorized if the second device identification number does not match the first device identification number, and each of the first and second device identification numbers includes a MAC address and an IP address of the respective device;

wherein the use conditions predefined by the fraud determination data include information about a time period during which the use of the software component is permitted; and the determination module obtains, through an operating system, date/time information about a date/time at which the software component is actually used.

2. The medium according to claim 1, wherein the fraud examination module comprises at least one of:

a module configured to display information indicating that the use of the software component is unauthorized;

a module configured to keep a record of an unauthorized use of the software component;

a module configured to stop an execution of the software component if the use of the software component is unauthorized; and a module configured to stop an operation of an application software program in which the software component is included if the use of the software component is unauthorized.

3. A software component management method for managing a software component, the method comprising the steps of:
examining, by a computer, when the software component is executed, whether a use of the software component is unauthorized; and
restricting, by the computer, the use of the software component if the use is unauthorized, wherein
the software component comprises fraud determination data which predefines use conditions about the use of the software component, the use conditions including a first device identification number which is unique to a device on which an installation of the software component is permitted and information about a time period during which the use of the software component is permitted, and
the step of examining includes the steps of
obtaining, by the computer, use data about an actual use of the software component, the use data including a second device identification number which is unique to a device on which the software component is actually installed;
determining, by the computer, whether the obtained use data matches the use conditions predefined by the fraud determination data; and
determining, by the computer, the use of the software component to be unauthorized if the second device identification number does not match the first device identification number, and each of the first and second device identification numbers includes a MAC address and an IP address of the respective device, said determining including obtaining, through an operating system, date/time information about a date/time at which the software component is actually used.

4. The method according to claim 3, wherein the use conditions predefined by the fraud determination data include information about a time period during which the use of the software component is permitted; and,
in the step of obtaining, date/time information about a date/time at which the software component is actually used is obtained through an operating system of a device on which the software component is actually installed.

5. The method according to claim 3, wherein, in the step of restricting, if the use of the software component is unauthorized, the use of the software component is restricted by performing at least one of the steps of:
displaying information indicating that the use of the software component is unauthorized;
keeping a record of an unauthorized use of the software component;
stopping an execution of the software component; and
stopping an operation of an application software program in which the software component is included.

6. A software component management system, comprising:
a software component capable of performing predetermined functions;
a user terminal on which the software component is installed; and
a component management server connected to the user terminal through a telecommunication line, wherein
the software component comprises a fraud examination module configured to examine, when the software component is executed, whether a use of the software component is unauthorized, and to restrict the use of the software component if the use is unauthorized,
the fraud examination module includes
fraud determination data which predefines use conditions about the use of the software component, the use conditions including a first device identification number which is unique to a device on which an installation of the software component is permitted;
a use information obtaining module configured to obtain use data about an actual use of the software component, the use data including a second device identification number which is unique to a device on which the software component is actually installed; and
a determination module configured to determine whether the obtained use data matches the use conditions predefined by the fraud determination data, and to determine the use of the software component to be unauthorized if the second device identification number does not match the first device identification number, and each of the first and second device identification numbers includes a MAC address and an IP address of the respective device;
wherein the use conditions predefined by the fraud determination data include information about a time period during which the use of the software component is permitted; and
the determination module obtains, through an operating system, date/time information about a date/time at which the software component is actually used.

7. The system according to claim 6, wherein the use conditions predefined by the fraud determination data include information about a time period during which the use of the software component is permitted; and
the determination module obtains, through an operating system, date/time information about a date/time at which the software component is actually used.

8. The system according to claim 6, wherein the fraud examination module comprises at least one of:
a module configured to display information indicating that the use of the software component is unauthorized;
a module configured to keep a record of an unauthorized use of the software component;
a module configured to stop an execution of the software component if the use of the software component is unauthorized; and
a module configured to stop an operation of an application software program in which the software component is included if the use of the software component is unauthorized.

9. The system according to claim 6, wherein the component management server transmits new fraud determination data for updating the fraud determination data through the telecommunication line to the user terminal; and
the fraud examination module in the user terminal updates the fraud determination data with the new fraud determination data transmitted from the component management server.

10. The system according to claim 9, wherein the component management server calculates a hash value of the new fraud determination data, encrypts the calculated hash value with a private key, and transmits the encrypted hash value to the user terminal along with the new fraud determination data; and
the fraud examination module in the user terminal calculates a hash value from the transmitted new fraud determination data, determines whether the calculated hash value matches a hash value obtained by decrypting the encrypted hash value transmitted from the component management server with a public key corresponding to the private key, and updates the fraud determination data if the calculated and obtained hash values match.

* * * * *